Aug. 10, 1954 F. S. MACKLEM 2,686,292

VARIABLE RELUCTANCE AMPLIFIER

Filed March 9, 1951 2 Sheets-Sheet 1

Inventor

F. SUTHERLAND MACKLEM

By Mitchell & Bechert

Attorneys

Aug. 10, 1954 F. S. MACKLEM 2,686,292
VARIABLE RELUCTANCE AMPLIFIER
Filed March 9, 1951
2 Sheets-Sheet 2

Inventor
By F. SUTHERLAND MACKLEM
Mitchell & Bechert
Attorneys

Patented Aug. 10, 1954

2,686,292

UNITED STATES PATENT OFFICE 2,686,292

VARIABLE RELUCTANCE AMPLIFIER

F. Sutherland Macklem, Freeport, N. Y., assignor to Servo Corporation of America, New Hyde Park, N. Y., a corporation of New York Application March 9, 1951, Serial No. 214,696

21 Claims. (Cl. 323—50)

My invention relates to devices variously known as saturable reactors, transductors, and magnetic amplifiers for the control of A.-C. power and is in the nature of an improvement over the circuits disclosed in my copending patent applications Serial No. 138,094, filed January 12, 1950, and Serial No. 149,235, filed March 13, 1950.

In the prior art, control of A.-C. power has been accomplished by means of electronic amplifiers or magnetic amplifiers. Electronic amplifiers have the disadvantage that they require associated D.-C. power supplies which are relatively bulky and expensive to construct. Magnetic amplifiers have the disadvantage that they rely upon saturation of a ferro-magnetic core material and therefore are inherently highly non-linear devices. In particular, they tend to deliver a highly distorted waveform to their load when excited with a sinusoidal input. In addition, the inherent non-linearity of magnetic amplifiers makes them extremely difficult to design for optimum performance. Furthermore, magnetic amplifiers introduce relatively long time delays which in some applications are very serious.

It is, accordingly, an object of the invention to provide an improved device of the character indicated.

It is another object to provide an improved means for controlling the power delivered to a two-phase load.

It is also an object to provide improved means for differentially resolving two independently variable signals.

It is a further object to provide an improved means for deriving, from two input signals (one variable independently of the other), an output signal of phase and magnitude reflecting the instantaneous relative difference between the input signals.

It is still another object to provide a two-phase variable reluctance control device with means for deriving substantially constant auxiliary voltages therefrom, more or less regardless of the controlled operation thereof.

It is a specific object to meet the above objects with an improved magnetic-control device which may not depend upon magnetic saturation or any of the phenomena associated with saturation.

It is another specific object to meet the above objects with variable-reluctance devices substantially less susceptible to magnetic-shunt paths and other spurious effects.

It is a further specific object to provide a servo amplifier incorporating improved selectable error-rate-damping characteristics.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Briefly stated, my invention contemplates means for controlling A.-C. power transferred magnetically from primary-winding means to secondary-winding means by introducing a variable reluctance in series with the magnetic path between the primary and the secondary. The invention utilizes magnetic-core means comprising two flux-loop paths, and at least a portion of each flux-loop path is independent of the other. Primary, secondary, and tertiary windings may be coupled to the independent portions of each flux-loop path; and, by interconnecting the primary windings in a sense opposed to interconnection of the secondary windings, a load across the secondary windings may be energized with a changing phase and magnitude reflecting changes in control impedance across a tertiary winding. In one form, the core means may be of three-legged configuration, with the center leg common to the two flux-loop paths, the windings being coupled to parts of the core external to the common leg; in another form, two completely independent cores may be employed. Whatever the core configuration, I show how further windings may be coupled to the two flux-loop paths and connected to each other to produce an essentially constant auxiliary-supply voltage, as for heater and B-plus supply, more or less regardless of changes in control impedance and, therefore, more or less regardless of changes in the proportional distribution of flux in the two flux-loop paths. I also show how a variable-reluctance control means of the character indicated may be utilized as a servo-amplifier, with selectable error-rate damping characteristics incorporated therein.

Figure 1:
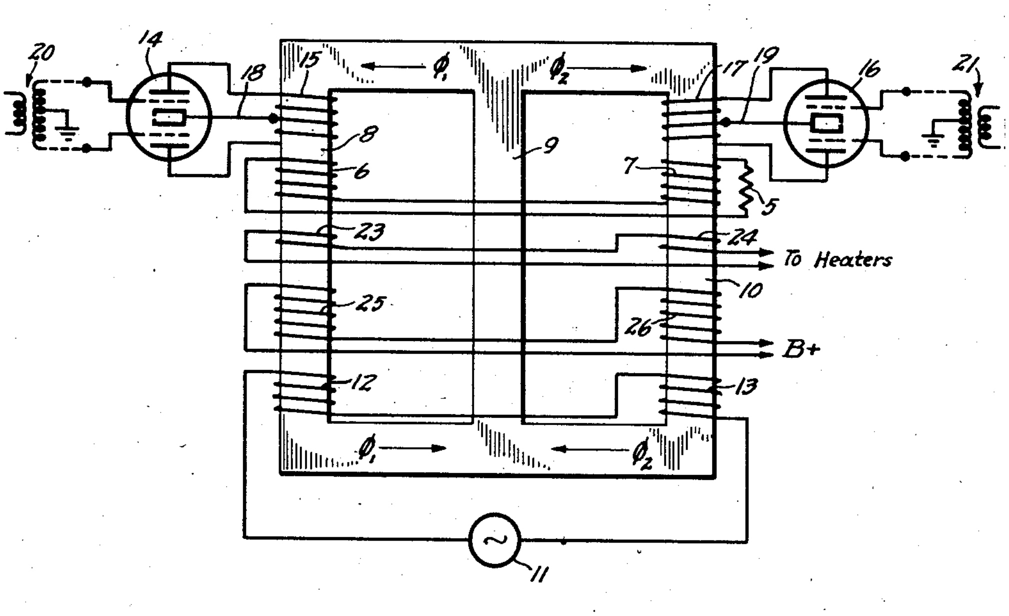
Fig. 1 is a simplified circuit diagram showing a control device according to the invention.

Referring to the schematic arrangement of Fig. 1, I show my invention in application to a means for controlling the magnitude and phase of power delivered to a two-phase load 5, which may be a reversible motor driven in one direction at varying speeds in accordance with varying resultant voltages of one phase induced in secondary windings 6—7; the motor 5 may be driven in the opposite direction at varying speeds in accordance with resultant voltages of opposite phase induced in the windings 6—7. To produce these results, the secondary windings 6—7 may be independently coupled to independent parts of two flux-loop paths, as defined by magnetic-core means of appropriate configuration.

In the form shown in Fig. 1, the magnetic-core means is a single element, as of the type disclosed in the above-mentioned copending applications. This element may include three legs—an outer leg 8, a middle leg 9, and another outer leg 10. The center leg 9 may be common to two flux-loop paths, defining flux circulations $\phi_1$ and $\phi_2$ independent of each other, except in the center leg 9, where the flows may be in the same direction. To establish such independent flux circulations, a single primary coil may be coupled to the center leg 9 and energized by a source 11 of alternating current; however, in the form shown, I employ two like primary windings 12—13 independently coupled to the two flux-loop paths at locations external to the common portion 9 of these paths. In order that the secondary output appearing across the load 5 may reflect the difference or resultant of fluxes $\phi_1$ and $\phi_2$, the primary windings may be so wound and connected to each other, with respect to the sense of winding and of interconnection of the secondary windings 6—7, that the primary connections are effectively the reverse or opposite of the secondary connections. In the form shown, both primary windings 12—13 advance in the same sense and are connected in series, while both secondary windings 6—7 advance in the same sense but are connected in opposition across the load 5.

It will be appreciated that with the same number of primary turns 12 linked to the left-hand flux loop 8—9 as the number of primary turns 13 linked to the other flux loop 9—10, and in the absence of conditions producing asymmetry of flux distribution, a given source excitation (11) will cause fluxes $\phi_1$ and $\phi_2$ to circulate with uniform magnitude and phase in their respective paths. Likewise, it will be understood that, if the number of turns in secondary winding 6 equal the number of turns in secondary winding 7, then the voltages induced in these windings will be of equal magnitude and opposite phase, so that no resultant voltage will be applied to the load 5, and the load 5 (in the case of a motor) will not operate.

As explained in the said copending application Serial No. 149,235, the motor 5 may be controlled by variable-reluctance means incorporated in one of the flux-loop paths, but, in the form shown, I employ such variable-reluctance means in conjunction with both flux-loop paths. Variable-reluctance control may be effected by variable-impedance means such as a space-discharge device 14 connected across a tertiary winding 15 linked to an independent part, such as the leg 8, of one of the flux-loop paths; with a similar construction for the other flux-loop path, a space-discharge device 16 may be connected across another tertiary winding 17, coupled to the independent leg 10. Each space-discharge device 14—16 may be a double triode connected in push-pull across its tertiary winding, with the cathodes connected at 18—19 to the mid-point of each tertiary winding. Suitable balanced input means 20—21 may be connected across the control means or grids of the space-discharge devices 14—16 in a well-known manner, for acceptance of control signals to be utilized in the differential energizing of the motor 5.

With the described arrangement, it will be appreciated that, if an input signal at 20 predominates over an input signal at 21, the tertiary winding 15 will restrict the flow of flux $\phi_1$ compared with flow of flux $\phi_2$, so that the secondary voltage induced at the winding 7 may predominate over that induced at 6; the phase of the voltage induced at 7 will be displaced with respect to the phase of the voltage induced at 6, so that the motor 5 will be energized in accordance with the difference between or resultant of these induced voltages. Likewise, should the input at 21 predominate over the input at 20, the reverse condition will apply, and the motor will be driven in the reverse direction.

It will be appreciated that the described construction is characterized by arrangement of the primary, secondary, and tertiary windings in relative proximity to each other and on the independent parts of each of the two flux-loop paths. Such construction assures that all flux $\phi_1$ generated in the core upon energizing primary coil 12 will be linked to the secondary and tertiary coils 6 and 15, and that all flux $\phi_2$ due to energizing primary coil 13 will be linked to the secondary and tertiary coils 7—17, regardless of magnetic-shunt effects, as occasioned by accidental proximity of other ferro-magnetic materials to the core. The presence of such shunts will have substantially no effect upon the separate flux-linkage relationships of the primary, secondary, and tertiary coils on the respective independent sides of the configuration.

As a further feature of the invention, I provide a means for utilizing the fluxes $\phi_1$—$\phi_2$, regardless of their relative magnitudes, in the generation of substantially constant auxiliary-supply voltages, as for example a heater supply and a B-plus supply. Constant heater voltage may be derived from two auxiliary coils 23—24, each having the same number of turns and connected in series, and each independently linked or coupled to the independent branches 8—10 of the two flux-loop paths. In a similar manner, two auxiliary coils 25—26 may be connected in series and coupled to the independent legs 8—10 for generation of a substantially constant B-plus supply. It will be seen that, since a constant source voltage at 11 may produce a constant total flux $(\phi_1+\phi_2)$, the total induced voltage in windings 23—24 (or in windings 25—26) may be substantially constant, regardless of the control effected by the space-discharge means 14—16.

Figure 2:
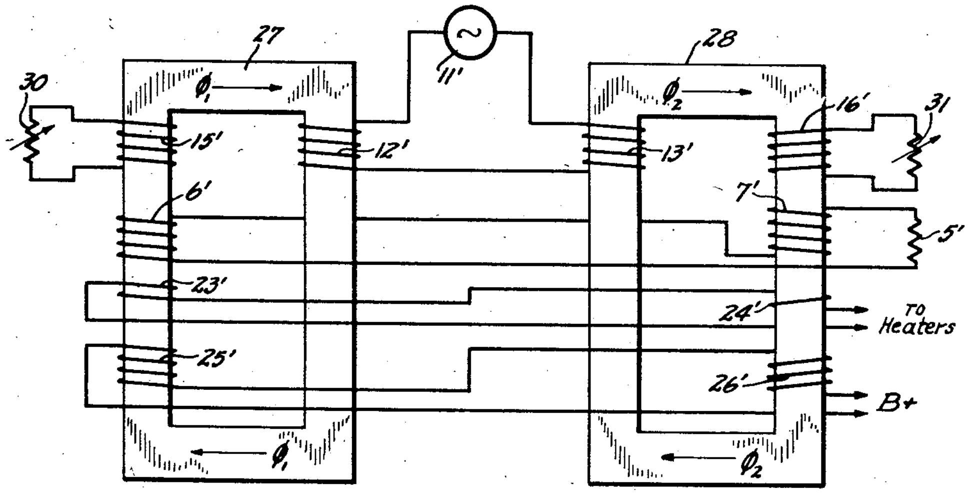
Fig. 2 is a diagram of a modification of Fig. 1.

In Fig. 2, I show an alternative arrangement which may lend itself to more ready packaging, in that for a given power capacity of the variable-reluctance control means, the magnetic-core means need not be so bulky in a given projection. To illustrate the functioning of this better-packaged construction, the magnetic-core means 27—28 of Fig. 2 is spread out, but it will be understood that the construction lends itself to a folded arrangement wherein the core means 27 and the core means 28 may be virtually sandwiched. In the arrangement of Fig. 2, the two flux-loop paths are completely independent and are defined by two independent cores 27—28. In view of the similarity of electric connection for the arrangement of Fig. 2 as compared with the arrangement of Fig. 1, functionally similar elements have been designated with the same reference numerals primed; thus, the source 11′ is applied across two like primary coils 12′—13′, each linked to independent portions of the two flux-loop paths. The secondary coils 6′—7′ are similarly linked to independent portions of the flux-loop paths, and the primary windings and the secondary windings are so wound and interconnected as to produce across the load 5′ a resultant voltage reflecting the instantaneous difference in flow of flux in the two paths of cores 27—28. For schematic purposes, I show a first variable resistance 30 and a second variable resistance 31 connected across the respective tertiary windings 15′—16′ for effecting the desired control of the motor 5′. As before, suitable interconnection of windings 23′—24′ and 25′—26′ may provide substantially constant heater B-plus and other supplies for auxiliary purposes.

Figure 3:
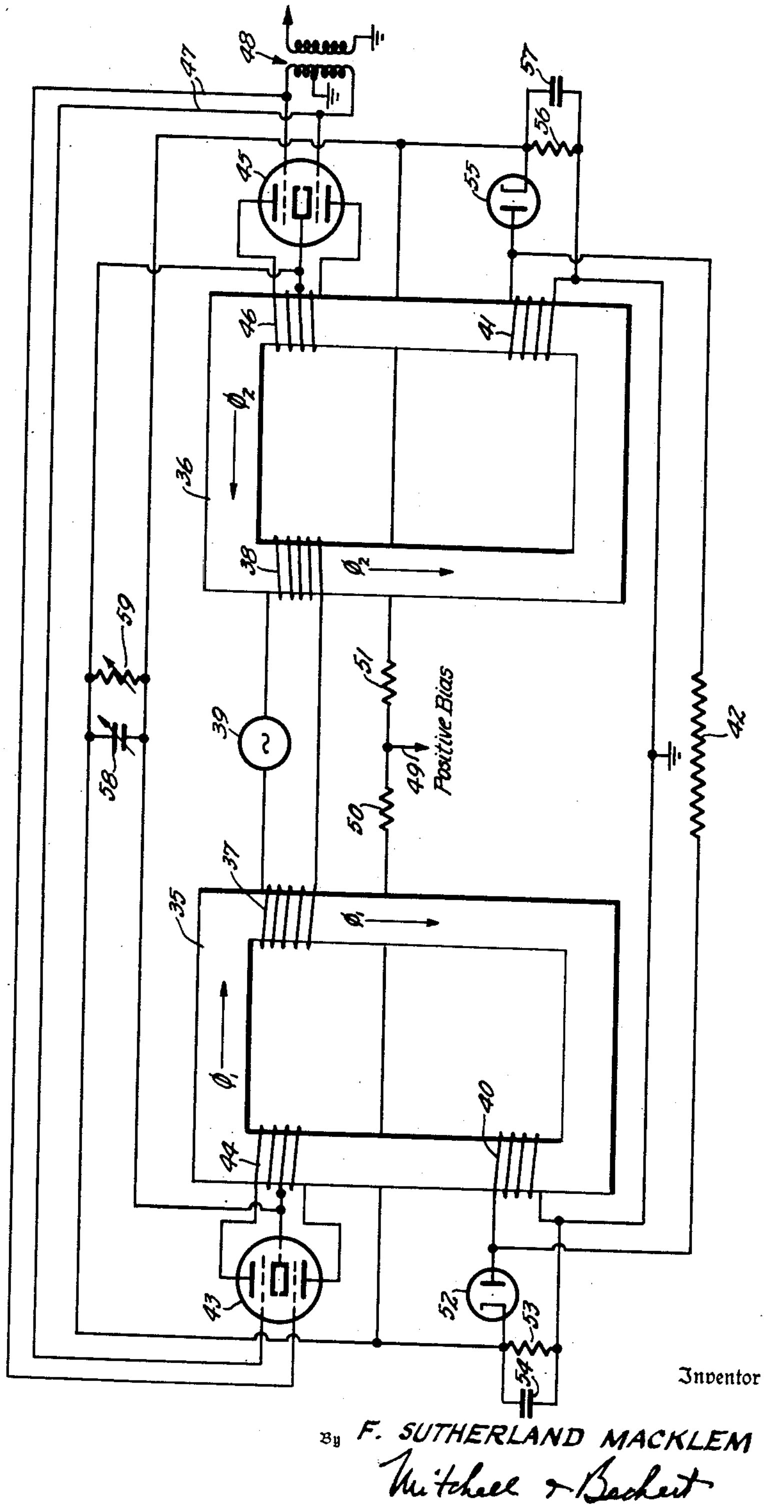
Fig. 3 is a further circuit diagram illustrating another modification.

As indicated generally above, it is a feature of the invention that my improved variable-reluctance control means may incorporate error-rate damping, with selectable characteristics for appropriate control in a servomechanism. I show such an arrangement in Fig. 3, wherein I employ a variable-reluctance device of the type shown in Fig. 2. In Fig. 3, fluxes $\phi_1$ and $\phi_2$ are circulated in two magnetic cores 35—36, constituting independent flux-loop paths. Primary windings 37—38 are so wound and interconnected that, when energized by the source 39, the fluxes $\phi_1$ and $\phi_2$ flow in opposite directions around the paths of core means 35—36. Secondary windings 40—41 may also be linked to the paths and interconnected to apply a resultant of their induced voltages across a load 42, which again may be a reversible two-phase motor. For control purposes, a first space-discharge means 43 may be connected in push-pull across tertiary winding 44, linked to the flux loop path of core 35; and in like manner, the space-discharge device 45 may be connected to a second tertiary winding 46.

In the form shown, the inputs to the space-discharge devices 43—45 are interconnected but with opposite phase, as by the lines 47, and these inputs are balanced with respect to ground on the secondary side of an input transformer 48. Positive-biasing means, at the connection 49, may be applied via suitable resistors 50—51 to the space-discharge means 43—45, as at the cathode circuits thereof, so as to bias both discharge devices 43—45 below cut-off in the normal situation in which fluxes $\phi_1$, $\phi_2$ circulate in their respective paths with the same magnitude and phase. Upon application of a given control signal at the input 48, one of the space-discharge devices 43—45 will be driven to saturation so as substantially to restrict the flow of flux in the path controlled thereby. Should this happen to the discharge device 45, the flow of flux $\phi_1$ in the core 36 will substantially increase in relation to the flux $\phi_2$, and a substantial secondary voltage will be generated across the secondary winding 40; this voltage will predominate over the secondary voltage at 41, and the motor 42 will be driven accordingly.

In accordance with the invention, I utilize this substantial increase in flux ($\phi_1$) to generate a feedback signal for immediate application as additional bias on the then-saturated space-discharge device (45). Such feedback or bias means may take numerous forms, but in the present arrangement I derive the necessary voltage directly from the secondary winding 40, as by employment of a rectifier, such as the diode 52, and suitable smoothing elements 53—54. The rectifier means 52—53—54 may be poled to superpose the desired transient bias on the normal steady positive bias (derived at 49).

In like manner, the reverse situation may be stabilized by a feedback connection from a secondary winding 41 to the space-discharge means 43, and again I show a diode rectifier 55 and smoothing elements 56—57 connected for appropriate transient biasing of the space-discharge means 43. If desired, a variable capacitance 58 may be bridged across the bias lines to the respective space-discharge devices 43—45, for changing the time constant of the error-rate damping which characterized operation of the two described feedback circuits. Similarly, a variable resistor 59 across the bias lines to the respective space-discharge devices 43—45 may provide a means of selectably controlling the magnitude of damping characterizing the error-rate compensation.

It will be appreciated that I have described an ingenious, and structurally relatively simple, variable-reluctance control means providing great flexibility of control for a multiple-phase load. My arrangements lend themselves to compact packaging, and the amount of power to be handled and delivered may be relatively great for a given-size package. The constructions may be extremely rugged and may utilize a minimum of vacuum tubes, may require a minimum of special power supplies, and may be relatively insensitive to spurious magnetic shunts as occasioned by the relative proximity of ferro-magnetic materials other than in the core of the device. As applied to stabilized control of a motor, my arrangement may provide very effective error-rate damping, with no impairment of power rating or of control response and sensitivity. Furthermore, the time constant and the magnitude of error-rate damping may be readily adjusted to meet a desired load-handling characteristic.

While I have described my invention in detail for the preferred forms shown, it will be understood that various changes and modifications may be made within the scope of the invention as defined in the appended claims.

I claim:

1. In a device of the character indicated, magnetic-core means comprising two closed flux-loop paths, primary-winding means including two separate primary windings respectively coupled to each of said paths for circulating fluxes independently in said paths when said primary-winding means is energized, secondary-winding means including two separate secondary windings respectively coupled to each of said paths and differentially connected, whereby a load connected to said secondary-winding means may be excited in accordance with the instantaneous difference in fluxes circulating in said paths, tertiary-winding means including two separate tertiary windings respectively coupled to each of said paths, and control means including impedances respectively connected to each of said tertiary windings, one of said impedances being variable, whereby the relative flux in said paths may be selectively varied while the total flux in said paths remains substantially constant, and also while said core means remains unsaturated.

2. A device according to claim 1, in which said flux-loop paths are magnetically independent of each other.

3. A device according to claim 1, in which said flux loop paths each have a common portion constituting a common leg of said core means.

4. In a device of the character indicated, magnetic-core means comprising two flux-loop paths, primary-winding means coupled to each of said paths for circulating fluxes in said paths when said primary-winding means is energized, secondary-winding means coupled independently to said paths and differentially connected, control means including a variable impedance and a tertiary winding coupled to one of said paths, and auxiliary-winding means independently coupled to each of said paths and connected in series, whereby for a given energizing of said primary-winding means the output of said auxiliary-winding means may be substantially constant regardless of variations in the relative magnitudes of fluxes circulating in said paths as affected by operation of said control means.

5. In a device of the character indicated, a three-legged transformer core comprising two outer legs and a central leg, primary-winding means coupled to said outer legs, second-winding means coupled to said outer legs, and tertiary-winding means coupled to said outer legs, said primary-winding means being interconnected to produce fluxes flowing in the same direction in said center leg when said primary-winding means is energized, said secondary-winding means being differentially connected, and control means including a variable impedance connected to one of said tertiary windings.

6. In a device of the character indicated, a three-legged transformer core defining essentially two flux-loop paths with a common leg, primary-winding means coupled independently to each of said paths externally of said common leg, secondary-winding means coupled independently to said paths externally of said common leg, and tertiary-winding means coupled to one of said paths externally of said common leg, whereby shunt magnetic paths may be ineffective to disturb flux linkages in said paths.

7. A device according to claim 6, in which said primary-winding means comprises an equal number of turns coupled to each of said paths.

8. A device according to claim 6, in which said secondary-winding means comprises an equal number of turns coupled to each of said paths.

9. In a device of the character indicated, magnetic-core means comprising two flux-loop paths, two like primary windings independently coupled to each of said paths, two like secondary windings independently coupled to each of said paths, said secondary windings being connected to each other in a sense opposed to the interconnection of said primary windings, and said primary windings being interconnected independently of said secondary windings, whereby upon energizing said primary windings said secondary windings may present differentially opposed outputs, and variable-reluctance means coupled to one of said paths for deriving in the combined outputs of said secondary windings a signal of magnitude and phase reflecting a control operation of said variable-reluctance means.

10. A device according to claim 9, in which two like auxiliary windings are coupled independently to said paths and are interconnected in the same sense as said primary windings are interconnected, whereby the output voltage of said auxiliary windings may be substantially constant for a given energizing of said primary windings, more or less regardless of control operations of said variable-reluctance means.

11. In a device of the character indicated, magnetic-core means comprising two flux-loop paths, primary-winding means for direct connection to a source of alternating current independently coupled to each of said paths for circulating fluxes independently in said paths when said primary winding means is energized, secondary-winding means independently coupled to said paths, said primary-winding means being coupled to said paths in a sense opposed to the coupling of said secondary-winding means to said paths, whereby the outputs of said secondary-winding means may reflect the differential combination of fluxes circulating in said paths, two tertiary windings each independently connected to one of said paths, control means including a variable impedance connected to one of said tertiary windings for controlling the flow of flux in a first path as compared with the flow of flux in the second path, and control-stabilizing means responsive to a coupling to said second path and connected to said control means in a sense opposed to the operation of said control means, whereby in an operation of said control means to reduce the flow of flux in said first path, with resulting increase in the flow of flux in said second path, said stabilizing means may respond to the increased flow of flux in said second path to offset or reduce the controlling operation of said control means.

12. A device according to claim 11, in which said stabilizing means includes a rectifier connected to bias said control means.

13. A device according to claim 12, in which said rectifier includes smoothing means.

14. A device according to claim 11, in which said control means includes a space-discharge device and in which said stabilizing means is connected in biasing relation with said space-discharge device.

15. In a device of the character indicated, magnetic-control means comprising two flux-loop paths, primary-winding means independently coupled to each of said paths for circulating flux independently in said paths when said primary-winding means is energized, secondary-winding means coupled independently to said paths, said primary-winding means and said secondary-winding means being coupled to said paths in opposed senses, whereby the output of said secondary-winding means may reflect a differential combination of the fluxes in said paths, a tertiary winding coupled to each of said paths, control means including a space-discharge device in controlling relation with each of said tertiary windings, first biasing means responsive to coupling with one of said paths and connected to bias the space-discharge device associated with the other of said paths with increasing force upon an increased flow of flux in said one path, second biasing means responsive to a coupling with the other of said paths and connected to bias the space-discharge device associated with the one of said paths with increasing force upon an increased flow of flux in said other path.

16. A device according to claim 15, in which said biasing means are interconnected by a variable impedance, whereby the damping function of said biasing means may be adjustably controlled.

17. A device according to claim 16, in which said variable impedance is a variable capacitor, whereby the time constant of error-rate damping may be adjustably selected.

18. A device according to claim 16, in which said impedance is a variable resistor, whereby the magnitude of error-rate damping may be adjustably selected.

19. In a device of the character indicated, magnetic-core means comprising two flux-loop paths, two like separate primary windings independently coupled to said paths, two like separate secondary windings independently coupled to said paths, two like separate tertiary windings independently coupled to said paths, said primary windings being interconected in a sense opposed to said secondary windings, first space-discharge means connected in push-pull to a first tertiary winding, second space-discharge means connected in push-pull to the second tertiary winding, means interconnecting the inputs to said push-pull space-discharge devices in a phased relation effecting a flux control in one path of phase opposite to that of the flux control in the other path upon application of a given input signal, fixed biasing means for said space-discharge means and connected to bias said space-discharge means below cut-off in the absence of a signal input, first variable biasing means responsive to an increased flow of flux in one path and connected in further biasing relation with the space-discharge means for said other path, and second variable biasing means responsive to an increased flow of flux in the other path and connected in further biasing relation with the space-discharge means for said one path.

20. In a device of the character indicated, magnetic-core means including two flux-loop paths magnetically independent of each other for at least a portion of each of said paths, primary, secondary, and tertiary coils coupled to the independent portions of said paths, means interconnecting said primary coils in a sense opposed to interconnection of said secondary coils, and control means including a variable impedance connected to one of said tertiary coils.

21. In a device of the character indicated, magnetic-core means including two flux-loop paths magnetically independent of each other for at least a portion of each of said paths, primary, secondary, and tertiary coils coupled in mutual adjacency to the independent portions of said paths, means interconnecting said primary coils in a sense opposed to interconnection of said secondary coils, and control means including a variable impedance connected to one of said tertiary coils.

References Cited in the file of this patent

UNITED STATES PATENTS

| Number | Name | Date |
|---|---|---|
| 1,306,525 | Cole | June 10, 1919 |
| 1,390,843 | Thompson | Sept. 13, 1921 |
| 1,739,699 | Whittle | Dec. 17, 1929 |
| 1,783,545 | Peters et al. | Dec. 2, 1930 |
| 1,902,466 | Ratkovszky | Mar. 21, 1933 |
| 1,953,519 | Tritschler | Apr. 3, 1934 |
| 2,552,952 | Gachet et al. | May 15, 1951 |

FOREIGN PATENTS

| Number | Country | Date |
|---|---|---|
| 322,775 | Great Britain | Dec. 2, 1929 |
| 409,656 | Great Britain | Apr. 24, 1934 |
| 460,285 | Great Britain | Apr. 17, 1935 |
| 646,551 | Germany | June 17, 1937 |
| 45,533 | Sweden | July 24, 1916 |